March 19, 1940.   N. JOHNSTON ET AL   2,194,229
APPARATUS FOR EXAMINING WELL CASINGS
Filed Oct. 15, 1938
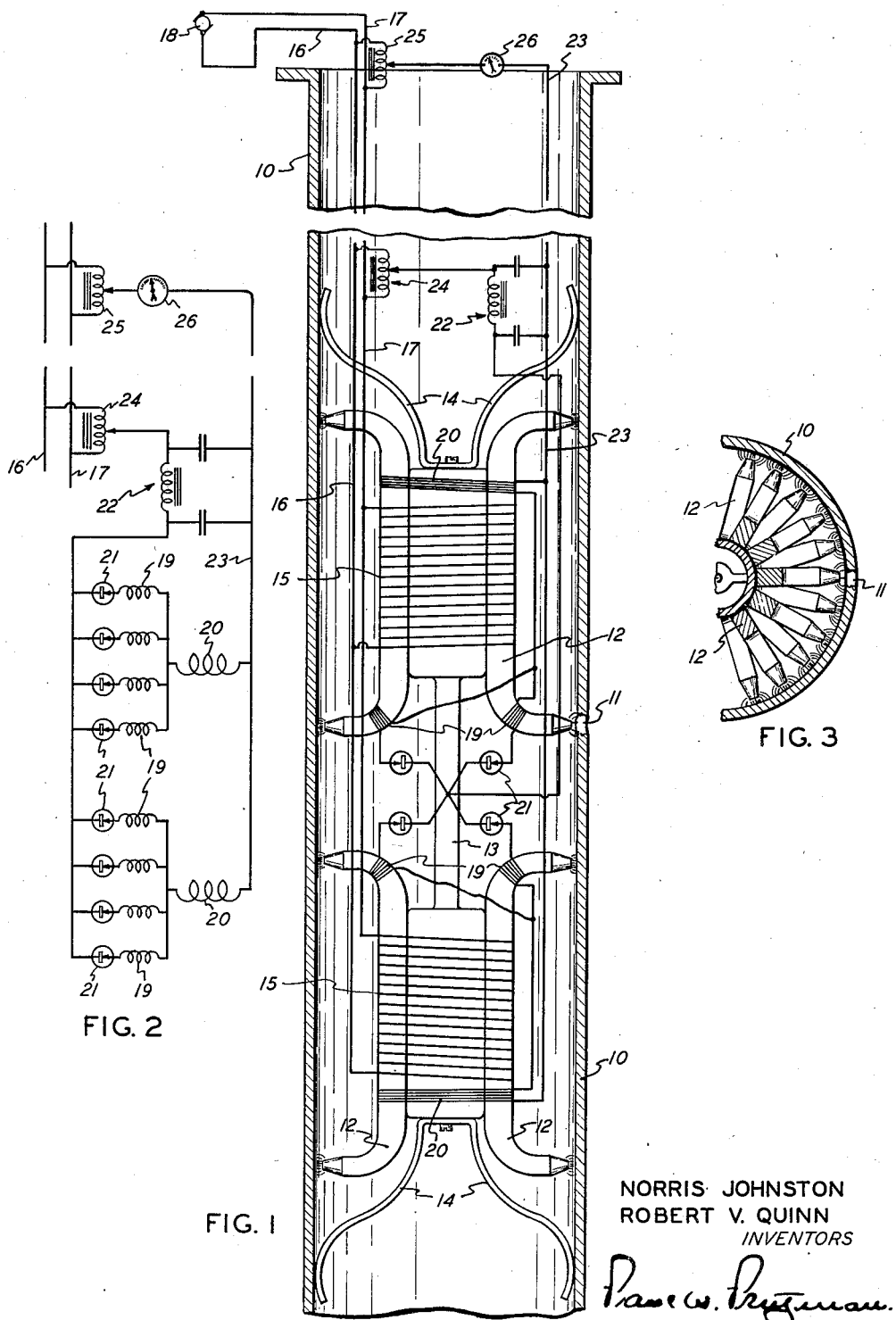
NORRIS JOHNSTON
ROBERT V. QUINN
*INVENTORS*
*ATTORNEY*

Patented Mar. 19, 1940

2,194,229

UNITED STATES PATENT OFFICE 2,194,229

APPARATUS FOR EXAMINING WELL CASINGS

Norris Johnston, Alhambra, and Robert V. Quinn, Los Angeles, Calif., assignors to Socony-Vacuum Oil Company, Incorporated, New York, N. Y., a corporation of New York Application October 15, 1938, Serial No. 235,214

6 Claims. (Cl. 175—183)

Our invention relates to the magnetic testing of materials and particularly to such testing of deep well casing.

When for any reason holes or irregularities appear accidentally in the casing of a well, it is very desirable to locate them quickly and accurately. Also, it is at times necessary to locate perforations intentionally made in a casing or to determine if a perforating operation has been successful.

At the present time there are some laborious and inefficient methods of finding such irregularities. Outside of the perforated zones, holes in casings may sometimes be found by setting two packers near together and testing for circulation through the casing wall. This generally fails in a cemented region. Location of salt water inflow is sometimes successful. Collapse may sometimes be located by various means which show a subnormal inside diameter of the casing, such as by the sticking of a bailer; in this case, however, collapsed casing and a sand bridge cannot be distinguished.

It is old in the art to test magnetic material for flaws by passing therethrough a magnetic flux, providing means responsive to variations in the flux, and thereby locating regions of abnormal magnetic reluctance. But, although deep well casings are almost invariably made of ferrous material, a satisfactory method of using magnetic testing in them has not heretofore been devised.

An object of our invention is to provide method and apparatus for the magnetic examination of casings in deep wells.

Another object of our invention is to provide a method of using simultaneously a plurality of magnetic circuits for the magnetic examination of materials.

Further objects will appear from a consideration of the following description and of the attached drawing, in which:

Fig. 1 is a diagrammatic representation of our testing instrument in place in a deep well casing;

Fig. 2 is a diagram of the secondary or testing electrical circuit shown separately, for the sake of greater clarity; and Figure 3 is a portion of a cross sectional view showing a suggested arrangement of magnetic yokes. Electrical parts are omitted in this figure.

Referring to the drawing and in particular to Fig. 1, 10 is a well casing and 11 is a hole which has developed therein by pitting or accident, or which has been made by intentional perforation.

We provide a plurality of magnetic yokes 12—12 whose exposed magnetic poles stand radially outward, facing the inner surface of the casing. These yokes may be made of iron or other suitable magnetic material, laminated for use with alternating current. It is preferred that the poles of these magnetic yokes be formed into blunt points or otherwise reduced in size in order that the magnetic flux enter the casing wall through a limited area in front of each pole.

These magnetic yokes shall be sufficient in number, and so disposed in relation to one another, that the entire circumference of the casing be exposed to testing as the assembly is moved longitudinally through the casing. A convenient arrangement would be two sets of yokes, in each set perhaps a dozen yokes arranged with equal spacing in a circle, and the two sets disposed one above the other and staggered circumferentially, as indicated in Fig. 3. This arrangement produces, in effect, two testing instruments supplemental to one another, electrically connected in parallel as will appear hereinafter, and mechanically attached rigidly to one another by any preferred means such as the bar 13. The testing instrument, so constructed or otherwise, should be kept centered in the casing by any suitable means, such as the spring-like skis 14—14. The industry is well acquainted with "centering guides" made of spring steel. Non-magnetic material should be used for structural parts other than the yokes.

Each set of magnetic yokes is energized by a primary coil 15 supplied with alternating current through wires 16 and 17 from any suitable source 18. In the embodiment of our invention herein described these wires 16 and 17 are also used as a portion of the secondary or testing circuit by the employment of a phantom circuit such as is well known in the art of telegraphy.

Around each of the magnetic yokes, preferably near the pole which is adjacent to the other set of yokes, is a secondary coil 19 responsive to the magnetic flux in that particular yoke. Around each entire set of yokes is a secondary coil 20 responsive to the total magnetic flux in the set. These coils 19—19 and 20—20 energize the secondary circuit, which is more clearly shown in Fig. 2.

In each of the units the coils 19—19 are connected in series with rectifiers 21—21 and in parallel between the coil 20 and the filter (common to both units) generally indicated at 22. Coils 20—20 are connected in parallel to wire 23 which runs to the earth's surface and the circuit is completed through power wires 16 and 17 by means of a phantom circuit produced by identically similar balanced choke coils 24 and 25 which have adjustable center taps. At the surface the electromotive force in the secondary circuit is amplified and measured as by voltmeter 26.

Coils 20—20 are reverse-wound with respect to coils 19—19 and are of a number of turns such that the electromotive force induced in each coil 20 will normally be balanced and approximately canceled out by that induced in each of the associated set of coils 19—19. Thus, as long as the magnetic flux is equal in all the yokes, as will be approximately true in perfect casing, the voltage in the secondary circuit will be low.

However if one of the magnet poles is closely in the vicinity of a flaw such as the hole 11 in Fig. 1, the flux in that particular magnet will be reduced by the abnormal reluctance of the casing. The electromotive force induced in the coil 19 associated with that magnet will be markedly reduced, while the opposite electromotive force induced in the corresponding coil 20 will be but slightly reduced. Therefore the voltage of coil 20 will not be balanced by the voltage of that particular coil 19, and this unbalanced voltage will then be applied through the rectifier and filter and the measuring circuit to the indicating device 26. The rectified current so produced cannot feed back into the other coils 19—19 and thus become substantially lost because of the other rectifiers 21—21 which do not permit a reverse flow.

Thus whenever a flaw in the casing is encountered by any one of the magnetic poles, the corresponding decrease in electromotive force in its associated coil 19 is transmitted, almost undiminished but as an increase, to the indicating device and the operator is given a strong, definite, and immediate indication of the existence of the flaw.

It would be entirely feasible and within the spirit of our invention to use a four wire cable, keeping the secondary circuit entirely free from electrical connection with the primary or energizing circuit. However it is very desirable to use a three-wire cable, not only because of the mere saving in material, but also because insulated three-wire cables designed for deep well exploration are available having been developed for such purposes as the geological examination of uncased bores. We therefore suggest the use of a phantom circuit such as is used in telegraphy. The type of phantom shown in the drawing employs the two balanced choke coils 24 and 25 connected across the power wires 16 and 17. The high impedance of these coils prevents the passage therethrough of any substantial amount of the alternating current in the power circuit, but the resistance is low and the direct current of the secondary circuit is readily superimposed on the power circuit. Since an unsmoothed rectified current partakes of the characteristics of an alternating current, it would be seriously impeded in choke coils 24 and 25 unless smoothed as by the filter 22. This filter, which comprises condensers and chokes in the conventional manner, results in the preservation of the high sensitivity inherent in our device.

The rectifiers 21—21 are preferably of the copper oxide type, since it is desirable that they be rugged, invariant with time and temperature, and free of moving parts.

It will be understood that the principle of our device is not confined to use in an instrument for testing well casings nor even to the examination of magnetic material for flaws, but that it is applicable to any magnetic testing device in which it is desirable to use a plurality of magnetic circuits in connection with a single electrical indicating circuit and yet to avoid the use of a commutating device and the consequent slowness of testing. In a case wherein positive indication of decreased rather than of increased magnetic reluctance is desired, such as in an instrument for finding concealed magnetic material, coils 20—20 or their equivalent would be eliminated. In such a case decreased reluctance in one of the magnetic circuits would make itself felt as increased electromotive force induced in the associated coil 19. This increased voltage would, due to the one-way characteristics of rectifiers 21—21, make its way substantially unreduced to the indicating means 26; just as in the present embodiment the current induced in a coil 20, temporarily finding a free path through a coil 19, does the same. In fact, the function of a coil 20 may be said to be the conversion of what would otherwise be a decrease in current produced by a coil 19 into an increase.

The particular embodiment of our invention herein shown and described is susceptible of various other changes than are herein suggested and we reserve the right to all such modifications as come within the scope of the appended claims. In these claims the term "responsive coil" denotes a coil such as one of the coils 19—19 of the illustrative embodiment and the term "master coil" denotes a coil such as one of the coils 20—20.

We claim as our invention:

1. A magnetic testing device comprising: a plurality of magnetic members with poles adapted to be placed in juxtaposition to the material to be tested; means for creating magnetic flux in said magnetic members; associated with each of said magnetic members a coil responsive to variations of magnetic flux therein; associated with a group of said magnetic members a master coil wound in reverse with respect to said responsive coils; means for forming an electric circuit containing said responsive coils in parallel to one another and said master coil in series with said responsive coils; means for indicating electrical variations in said circuit; and means for substantially preventing the electric current flowing through any one of said responsive coils from flowing back through others of said responsive coils.

2. A magnetic testing device comprising: a plurality of magnetic members with poles adapted to be placed in juxtaposition to the material to be tested; means for creating magnetic flux in said magnetic members; associated with each of said magnetic members a coil responsive to variations of magnetic flux therein; a plurality of master coils wound in reverse with respect to said responsive coils and each associated with a group of said magnetic members; means for forming an electric circuit containing said responsive coils connected with one another in parallel in groups, one of said master coils in series with each said group of responsive coils, and the several combinations so formed connected in parallel with one another; means for indicating electrical variations in said circuit; and means for substantially preventing the electric current flowing through any one of said responsive coils from flowing back through others of said responsive coils.

3. A device substantially as described in claim 1, in which said responsive coils and said reverse-wound master coil are so chosen that the electromotive force normally induced in each responsive coil is substantially equal to that induced in said master coil.

4. A device substantially as described in claim 1, made suitable for the examination of ferrous tubular goods by forming said magnetic members as yokes and arranging them in circular formation with poles facing radially outward.

5. A device substantially as described in claim 1 in which said means for creating magnetic flux is an electric circuit provided with alternating current, in combination with means for completing the circuit containing said responsive coils by superposing the current thereof upon portions of said alternating-current circuit.

6. Apparatus for detecting irregularities in a magnetic field, comprising: a plurality of similar responsive coils arranged in inductive relation to small portions of said magnetic field; a master coil arranged in inductive relation to a relatively large portion of said magnetic field, said master coil being so chosen that the electromotive force induced therein is substantially equal to the electromotive force normally induced in each of said responsive coils; a plurality of rectifiers; means for forming an electric circuit containing said responsive coils in parallel to one another, one of said rectifiers in series with each of said responsive coils, and said master coil in series with the group of said responsive coils, said responsive coils being in opposed relation to said master coil; and means for indicating electrical variations in said circuit.

NORRIS JOHNSTON.
ROBERT V. QUINN.